(12) United States Patent
Vinson et al.

(10) Patent No.: US 10,929,871 B2
(45) Date of Patent: Feb. 23, 2021

(54) SYSTEM AND METHOD FOR ANALYZING THE EFFECTIVENESS OF CONTENT ADVERTISEMENTS

(71) Applicant: Rentrak Corporation, Portland, OR (US)

(72) Inventors: Michael Vinson, Piedmont, CA (US); Amir Yazdani, Portland, OR (US)

(73) Assignee: Rentrak Corporation, Portland, OR (US)

( * ) Notice: Subject to any disclaimer, the term of this patent is extended or adjusted under 35 U.S.C. 154(b) by 499 days.

(21) Appl. No.: 13/861,337

(22) Filed: Apr. 11, 2013

(65) Prior Publication Data

US 2013/0275205 A1   Oct. 17, 2013

Related U.S. Application Data

(60) Provisional application No. 61/623,035, filed on Apr. 11, 2012.

(51) Int. Cl.
*G06Q 30/02* (2012.01)

(52) U.S. Cl.
CPC ..... *G06Q 30/0243* (2013.01); *G06Q 30/0241* (2013.01)

(58) Field of Classification Search
CPC ...... G06Q 10/107; G06Q 30/02; G06Q 10/10; G06Q 20/3574; G06Q 50/06; G06Q 30/0276; G06Q 30/0277; G06Q 30/0241; G06Q 30/0242; G06Q 30/0251
USPC ........... 705/14.42, 14.4, 14.41, 14.49, 14.53, 705/14.68
See application file for complete search history.

(56) References Cited

U.S. PATENT DOCUMENTS

| | | | | |
|---|---|---|---|---|
| 2003/0233339 A1* | 12/2003 | Downs | ........... | G06Q 30/02 |
| 2004/0031045 A1* | 2/2004 | Ivanyi | ........... | H04H 60/33 725/14 |
| 2004/0268419 A1* | 12/2004 | Danker | ........... | H04N 7/173 725/136 |
| 2007/0089129 A1* | 4/2007 | Verhaegh | ........... | G06Q 30/02 725/35 |
| 2007/0157242 A1* | 7/2007 | Cordray | ........... | H04H 60/33 725/46 |
| 2010/0088714 A1* | 4/2010 | Hawkins | ........... | H04H 20/14 725/14 |

(Continued)

OTHER PUBLICATIONS

Hsieh et al., "How different information types affect viewer's attention on internet advertising," Dec. 30, 2010, Computers in Human Behavior 27 (2011) 935-945. (Year: 2010).*

*Primary Examiner* — Christopher B Tokarczyk
(74) *Attorney, Agent, or Firm* — BakerHostetler

(57) ABSTRACT

A system and method to analyze the effectiveness of advertisements of presented content. The advertisements include advertisements for which the behavior desired by the advertiser is to drive a viewer to perform a certain action, such as to watch particular television program content. The system determines if an advertisement is effective by correlating exposure to presented advertisements with the subsequent presentation of content that was promoted in the advertisements. To perform the analysis, the system collects tune data from set top boxes, digital video recorders (DVRs), or other component capable of storing tune data related to the content presented on an associated display component.

18 Claims, 9 Drawing Sheets

(56) References Cited

U.S. PATENT DOCUMENTS

| | | | |
|---|---|---|---|
| 2010/0235868 A1* | 9/2010 | Howarter | H04N 5/76 |
| | | | 725/82 |
| 2010/0235925 A1* | 9/2010 | Lee | G06F 21/10 |
| | | | 726/30 |
| 2010/0280876 A1* | 11/2010 | Bowra | H04N 21/262 |
| | | | 705/14.41 |
| 2010/0293566 A1* | 11/2010 | Valdez | H04N 21/25891 |
| | | | 725/14 |
| 2012/0278828 A1 | 11/2012 | Yazdani et al. | |
| 2014/0040008 A1* | 2/2014 | Belani | G06Q 30/02 |
| | | | 705/14.41 |

* cited by examiner

FIG. 4A

| Advertisement Identifier | Advertisement Start time | Advertisement Duration | Advertisement Channel | Advertised Content Identifier |
|---|---|---|---|---|
| Ad 1 | April 3, 2010, 7:25:06 PM | 1 minute | ABC | Content 1 |
| Ad 2 | April 21, 2010, 9:25:00 PM | 30 seconds | ABC | Content 1 |
| Ad 3 | April 27, 2010, 8:45:30 PM | 30 seconds | ABC | Content 1 |
| Ad 4 | May 2, 2010, 7:25:06 PM | 1 minute | ABC | Content 1 |
| Ad 5 | May 10, 2010, 7:25:06 PM | 30 seconds | ABC | Content 1 |
| Ad 6 | May 11, 2010, 8:45:30 PM | 1 minute | ABC | Content 1 |

FIG. 4B

| Content Identifier | Content Start Time | Content Duration | Content Channel | Content Title |
|---|---|---|---|---|
| Content 1 | May 11, 2010, 9:00:00 PM | 60 minutes | ABC | Lost, Season 6, Episode 14: "The Candidate" |

600

| Advertisement Identifier | Advertised Content Identifier | Display Component List |
|---|---|---|
| Ad 1 | Content 1 | ... |
| Ad 2 | Content 1 | DC 1, ... |
| Ad 3 | Content 1 | DC 1, DC 2, ... |
| Ad 4 | Content 1 | ... |
| Ad 5 | Content 1 | ... |
| Ad 6 | Content 1 | DC 1, ... |

| Content Identifier | Display Component List: |
|---|---|
| Content 1 | DC 1, DC 3, ... DC n |

SYSTEM AND METHOD FOR ANALYZING THE EFFECTIVENESS OF CONTENT ADVERTISEMENTS

CROSS-REFERENCE TO RELATED APPLICATION(S)

This application claims the benefit of U.S. Provisional Patent Application No. 61/623,035, entitled "SYSTEM AND METHOD FOR ANALYZING TELEVISION CONTENT ADVERTISEMENT EFFECTIVENESS," filed Apr. 11, 2012, which is incorporated herein by reference in its entirety.

BACKGROUND

Using television and other content distribution channels, advertisers are provided with a large audience to promote various products. By measuring the purchase of promoted products, advertisers can gauge if viewers are effectively performing the action promoted in an advertisement. However, when the promoted product is not material and sale of the promoted product cannot be easily measured, advertisers have no concrete form of determining how effective their advertisements are at driving a desired behavior without requiring expensive studies and various inputs from actual viewers of those advertisements. For example, for advertisements corresponding to other broadcast content, advertisers are unable to know if their advertisements are effectively causing the viewers to tune to the advertised content. Accordingly, advertisers often advertise such content multiple times in order to increase the likelihood that viewers will act on the advertisement. Unfortunately, advertisers are unable to assess how effective advertising exposures are in driving consumer behavior for a given number of exposures. Often television advertisers must infer, guess, or simply not know how effective their television advertisements are in driving the desired behavior of the viewer. The result can be an inefficient use of advertising space, a waste of advertising money, and even less likelihood of business success for the advertiser as well as the broadcast network.

Accordingly, it is in the best interests of the advertising industry for there to exist effective methods of accurately determining the effectiveness of advertisements.

BRIEF DESCRIPTION OF THE DRAWINGS

FIGS. 4A-4B depict representative data sets for advertisement and content, illustrated as tables, for use in the content advertisement effectiveness system.

FIG. 6A-6B depict representative data sets for presented advertisements and presented content which are used by the advertisement effectiveness analysis system.

DETAILED DESCRIPTION

Figure 1:
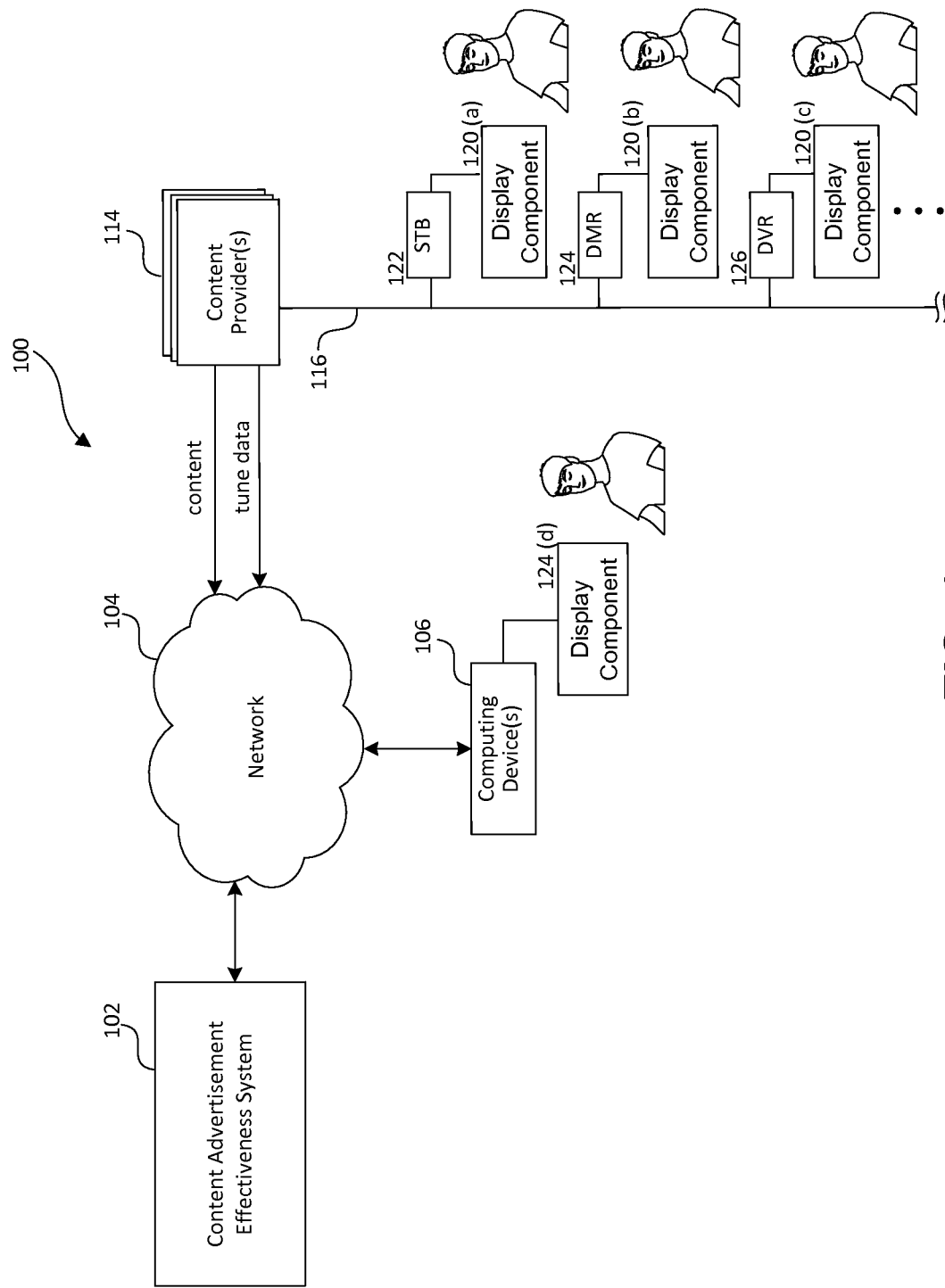
FIG. 1 illustrates an environment in which a system for analyzing advertisement effectiveness operates to determine the effectiveness of advertisements for content.

A system and method to analyze the effectiveness of advertisements of content, such as television or other video content, is disclosed. The advertisements are designed by advertisers to drive a viewer to watch particular video content, such as certain programs, live events, or series (herein "content advertisement"). The system determines if an advertisement is effective by correlating exposure to presented advertisements with the subsequent viewing of content that was promoted in the advertisements. The effectiveness of advertisements may be presented to advertisers to allow advertisers to more efficiently manage their advertising spend.

To assess the effectiveness of advertising, the system collects tune data from set top boxes, digital video recorders (DVRs), or other component capable of storing tune data related to the content presented on an associated display component. The collected tune data is stored with an associated display identifier, which reflects the particular display component from which the tune data was received. The system additionally receives advertisement data and content data that reflects content and advertisements available for viewing on the display components. The content data includes information describing available content, such as date and time of airing of the content, the channel on which the content was broadcast, for at least the advertised content. The advertisement data includes information describing presented advertisements, such as distribution channel, date, and time of airing of each advertisement. The system matches the received advertisement data and content data with the collected tune data in order to identify specific content and advertisements that were presented on a particular display component. The presentation data is then used or stored by the system, e.g., in a storage database.

The advertisement data and the content data can be determined by the system, included in the collected tune data, or provided by a third party, such as the cable provider for the display component. The data is filtered to identify the advertisements and content presented (e.g., viewed) on the display components from which the tune data is collected. The system then further analyzes presented advertisement data and presented content data to identify, on a display-by-display basis, the specific content and advertisements that were likely presented to a viewer based on the tuning data. The correlated data for each display can include, for example, advertisement(s) (e.g., "Ad 1", "Ad 2", "Ad 3") which promote a specific content (e.g., "Content 1") on display components (e.g., "DC 1," and "DC 3") each of which later viewed the specific content (e.g., "Content 1"). The correlated results can be further processed by the system to assess the effectiveness of advertisements. For example, for a particular program ("Content 1") broadcast on a channel (e.g., CBS), the system may provide a report listing the number of advertisements presented, the number of display components presenting the advertisements and the advertised content, and a percentage of the display components on which the advertisement(s) and the content were estimated to be viewed. The report can include various other statistics relating to the effectiveness of an advertisement as well. The reported results can be utilized by the system to construct a graphical representation of the correlation between content advertisement and content presented on a display component, which is utilized to assess the effectiveness of the advertisement.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

FIG. 1 and the following discussion provide a general description of a suitable environment 100 in which a content advertisement effectiveness analysis system ("system") 102 is implemented. As shown in FIG. 1, various components allow data representing the presentation of video content (e.g., television content) on a plurality of display components 120(a), 120(b), 120(c) . . . 120n to be collected and analyzed. As used herein, "display component" refers to any video playback device in which a user is able to view video content in a real-time or time-shifted basis. For example, a display component can include a television, computer, mobile phone with video playback capabilities, etc. Tune data reflecting the content presented on the display component is collected by a tuner device coupled to the display component. The tuner device can include, for example, a television set top box ("STB") 122, a Digital Video Recorder ("DVR") 126, a satellite receiver, a cable modem, a DSL modem, a network gateway (wired and/or wireless), a digital media receiver 124, or any other component in a content distribution system that is able to detect when video content is presented to a viewer. The tuner device may be separate from the associated display component 120, or may be integrated within the display component 120. The system 102 collects tune data or other data representing the presentation of video content on the plurality of display components 120. Tune data may also be referred to herein as presentation data.

The system 102 is configured to receive tune data from one or more content providers 114. In the representative environment, the depicted content provider 114 is a cable television operator that transmits program signals on a cable 116 (e.g., coaxial, optical). Content providers also include, but are not limited to, satellite television operators, local or regional broadcasters, and distributors of content over other transmission media such as the Internet or other network. Subscribers and end users view the program signals on televisions, video monitors, audio/video playback devices, and/or display components 120.

Each of the display components is associated with a corresponding internal tuner or external set top box (STB) 122 that serves as an interface between the display component and the cable 116 or other transmission means on which the television program or other audio-video content is received. In some embodiments, the set top boxes 122 comprise cable television converters or satellite dish receivers. However, set top boxes can also include digital video recorders (DVR), gaming consoles, audience measurement meters or other electronic components, which either allow a user to tune to a desired audio/video stream, or provide the functionality of recording tune events for later analysis. Broadly stated, the phrase "set top box" is used herein to refer to any device, component, module, or routine that enables tune data to be collected from an associated display component. Set top boxes may be stand-alone devices or set top box functionality may be incorporated into display components.

The content providers 114 may also directly transmit content to other display components via network 104. For example, display components may also include smartphones, computers, tablets, etc. Content may be directly streamed to the display components from content provider 114, or indirectly via devices such as digital media receivers (DMRs) 124. As used herein, a "display component," therefore, also encompasses computers, smartphones, laptops, tablets, or other computing devices capable of displaying content provided by a content provider.

The content provider 114 receives signals indicative of tuning and other events that occur on display components. The tune data provides the channel to which a display component is tuned as well as time stamps associated with tuning events. By analyzing tune data, the system can estimate the duration that a display component is tuned to a particular channel. The tune data can also provide such information as channel changes, recording or replaying of content that was transmitted to a STB, and changes in play back of content, such as when a subscriber pauses, fast forwards or rewinds a program or otherwise varies its normal playback.

The content advertisement effectiveness system 102 receives tune data from content providers 114, from third-party aggregators of tune data (not shown), and/or directly from tuner devices associated with display components. The tune data can be received over networks 104, such as public or private networks, and wired or wireless networks, including the Internet. Alternatively, on a periodic basis, the tune data may be provided to the system 102 by a content provider or third-party aggregator on a computer readable media such as tape drive, DVD, CD-ROM, flash drive, mechanical or solid state hard drive, etc.

Figure 2:
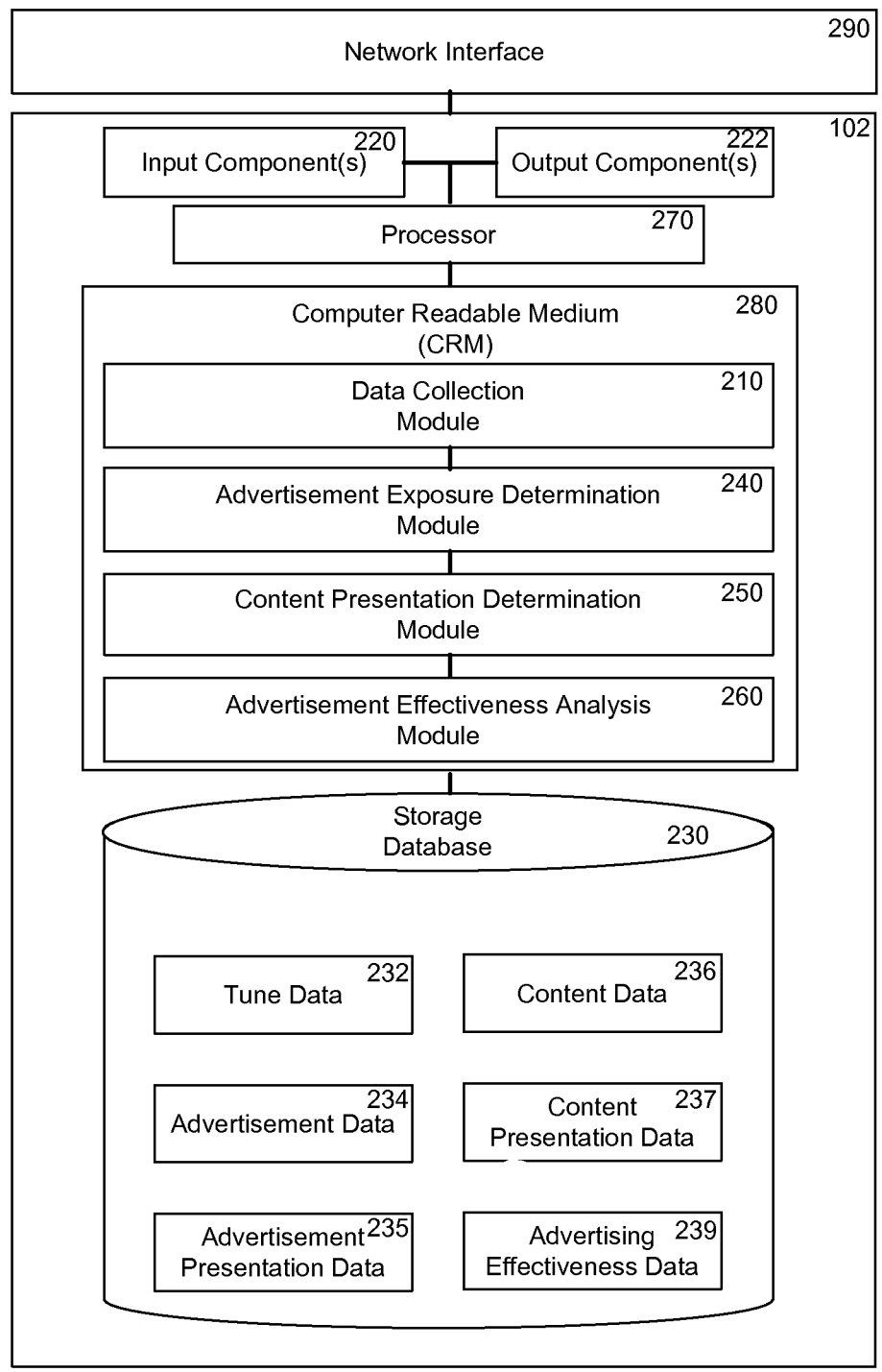
FIG. 2 is a block diagram of representative computer system for use in the system of FIG. 1.

FIG. 2 is a block diagram of an exemplary computing system on which the system 102 for analyzing content advertisement effectiveness can be implemented. The system receives the tune data over a network via a network interface 290. The system stores the tune data in a storage database 230, which can be accessed by the system for further processing. The storage database 230 may be any combination of databases, datasets, flat files, etc. stored in computer memories (RAM/ROM/Flash, and so on), hard drives, remote network servers, or other data storage components or computer-readable storage devices. Although a single storage database 230 is illustrated in FIG. 2, it will be appreciated that the storage area may include multiple physical or logical storage areas. The storage database 230 may store data that is utilized, generated, or modified by the system, such as tune data 232, advertisement data 234, advertisement presentation data 235, content data 236, content presentation data 237, and advertising effectiveness data 239.

The system 102 further includes a non-transitory computer-readable medium ("CRM") 280 on which computer-readable instructions are encoded for performing an analysis of tune data. The CRM 280 is coupled to a processor 270, which executes the stored instructions in order to implement the functionality disclosed herein. In particular, the system 102 includes instructions specifying a particular module of one or more modules located within the CRM 280 to perform a function on stored data, such as collected tune data. For example, the CRM 280 can include a data collection module 210, an advertisement exposure determination module 240, a content presentation determination module 250, and an advertisement effectiveness analysis module 260. The operation of each module will be described in the following paragraphs with further reference to the methods and corresponding data sets illustrated in FIGS. 3-9.

Figure 3:
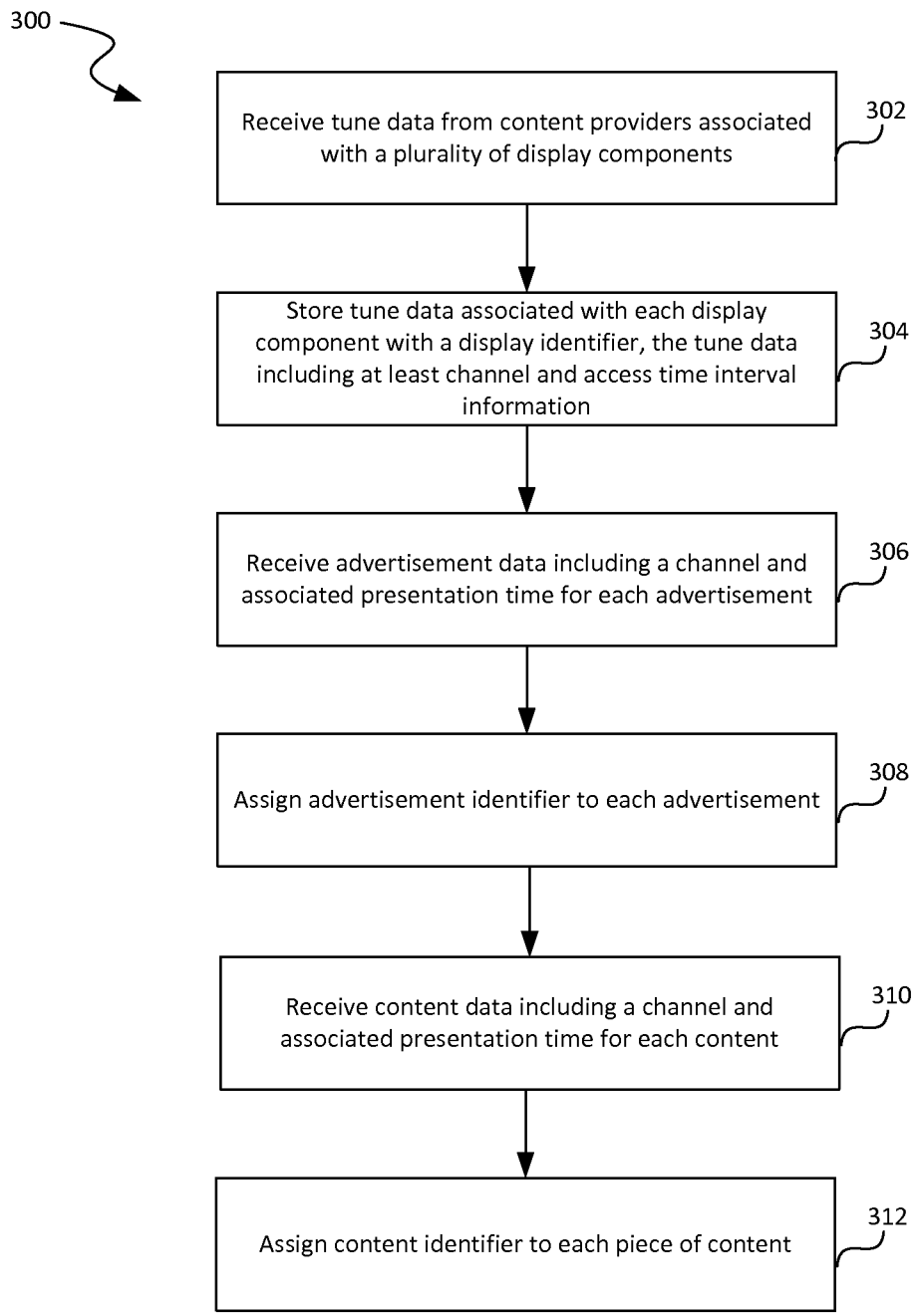
FIG. 3 is a flow diagram of a process performed by the system to collect advertisement and content presentation data.

FIG. 3 is a flow chart for a method 300 performed by the data collection module 210. At block 302, the data collection module 210 receives tune data from content providers, third parties, and/or tuners via network interface 290. The data collected includes advertisement data and content data for content presented by content providers 114, as well as tune data collected from various display components tuned to the presented content. The data may be received by the system through network interface 290 from content providers, such as cable providers, from third parties providing data relating to content presented over a network and displayed on a display component, or directly from tuning devices associated with display components.

The collected tune data 232 includes information about channels that a display component is tuned to, directed to, or otherwise accessing and the associated times at which that channel is accessed. As used herein, "channel" refers to any identifier of a particular source of video content, for example: a network name (e.g., "ABC"), a broadcast organization's call sign (e.g., "KOMO-TV"), an analog or digital broadcast or demodulation frequency (e.g., 615.25 MHz), a "real" channel (which may correspond to an actual transmission frequency; e.g., "38"), a "virtual" channel (not representing an actual frequency, e.g., "SiFy channel"), a main channel by itself (e.g., "4"), a sub channel number by itself (e.g., "0.1"), a main channel combined with a sub channel (e.g., "4.1"), a digital networking address such as an internet protocol ("IP") address, a uniform resource locator ("URL"), or a video sharing website channel (such as a YouTube user's content channel), a content identifier (e.g., "Superbowl 2011", "Seinfeld season 3, episode 2", or the name of a pay per view program), or any other content identifier utilized for cable television, broadcast television, satellite television, internet television, other video viewing.

The tune data may include, for each channel accessed on a display component, one or more associated times of the channel access, such as time-date stamps for when the channel access began and ended. The time-date stamp may be stored in different formats, such as the number of seconds elapsed since epoch, International Organization for Standardization (ISO) 8601 formatted combined date and time, etc.

The tune data for a display component (e.g., display component 120*a*) is associated with a unique identifier for the display component, so that the tune data is attributable to that display component. The unique identifier may be an identifier of the customer premises equipment (e.g., the MAC address of the STB for the display component 120*a*), an identifier of a user associated with the display component 120*a* (e.g., a cable television customer account number, phone number, etc.), a globally unique identifier (GUID), the address of the physical location of the display component, or similar identifying element.

At block 304, the data collection module 210 stores collected tune data in tune data storage area 232 for subsequent access by various other system modules. The tune data is stored with the associated unique identifier such that, when accessed, the display component with which the tune data is associated can be identified. The tune data that is stored contains at least information regarding the channel to which a display component is tuned and the access time interval for that channel. The access time interval can include a first timestamp for the time at which the display component accessed a channel and a second timestamp for the time at which the display component was powered off or tuned to another channel. Accordingly, the duration, or time interval, for which the display component was tuned to that particular channel can be calculated by the difference in time between the first and second timestamps.

Before, during, or after collection by the data collection module 210 and storage in the storage area 232, the data may be processed or cleaned. For example, the raw tune data may be cleaned to remove any unnecessary additional data, to remove clearly erroneous data, and to format the data into a common storage convention to compare cross-tuning device. The system may also process the raw tune data to extrapolate only information relating to a specific attribute of the data, such as the collected content data and advertisement data.

At block 306, the data collection module 210 receives advertisement data from content providers or other third party sources. The advertisement data includes information about one or more advertisements that have been provided to content providers for presentation on display components to advertise content. The advertisements are intended to promote content for viewers to consider watching in the future. For example, an advertisement may include information for a television program airing at a later time on the same channel on which the advertisement is presented. The advertisement data received by the system may reflect the schedule of future advertisements that are to be shown by content providers, or may reflect the schedule of past advertisements that have already been presented by content providers.

When the data collection module 210 receives the advertisement data, the advertisement data is processed to extrapolate information regarding the advertisements included in that data. The advertisement data may include, for example, information providing the channel on which the advertisement is scheduled to be broadcast along with the presentation time for that broadcast. FIG. 4A is an example of advertisement data that has been processed by the system and the results of the processing stored in a table 410 as an advertisement data set. Each row in the table represents the presentation of a different advertisement. Each column in the table contains information characterizing the advertisement or its presentation, including an advertising identifier field 412, an advertisement start time field 414, an advertisement duration field 416, an advertisement channel field 418, and an advertised content identifier field 422. At block 306, the system assigns each advertisement with an identifier as shown in field 412 that is used for tracking purposes. The system also stores a time the advertisement was broadcast in field 414, the duration of the advertisement in field 416, information on which channel the advertisement was broadcast in field 418, and an identifier relating to the content being advertised 422. For example, the table 410 shown in FIG. 4A indicates that a series of 30 second or 1 minute long television commercials (Ad 1, Ad 2, Ad 3, etc.) on the channel "ABC" have been presented to promote content associated with the content identifier "Content 1". When an advertisement is repeated in multiple times and/or channels, the system stores additional information about those advertisement repetitions as well. In some embodiments, if information is lacking to populate table 410, a user of the system 102 ("system user") provides supplemental information about the one or more presented advertisements. The resulting advertisement data set is stored by the system in the advertisement data storage area 234.

In some examples, the system 102 may filter the advertisements according to some criteria to cull advertisements related to non-televised content. For example, the system 102 may remove advertisements in categories not relating to televised content (e.g., the system may remove Public Service Announcements, advertisements for "Petroleum Companies", "Cold & Sinus Remedies", "Insurance," etc.), which could appear in the advertisement data 234. The system retains, however, those in categories representing televised content, often referred to as "promotionals".

At block 308, the data collection module 210 receives data relating to the programming, or scheduled content, for one or more content providers. The content data provides details about each piece of content that has been, or will be, presented to viewers on display components. The content data may include, for example, information providing the channel on which the content is broadcast along with the presentation time for that broadcast. FIG. 4B is an example of content data that has been processed by the system and the results of the processing stored in a table 420 as a content data set. Each row in the table represents the presentation of a different piece of content. Each column in the table contains information characterizing the content or its presentation, including a content identifier field 422, a content start time field 424, a content duration field 426, a content channel field 427, and a content title field 428.

At block 312, a content identifier is assigned to the program content, (e.g., "Content 1") by the data collection module 210. The content identifier can be utilized to cross-correlate the presentation of the content and promotion of the content, e.g., content advertisement, in the analysis performed by the system. For example, field 424 indicates the scheduled start time for the content, e.g., May 11, 2010 at 9:00 PM eastern standard time. Field 426 indicates the duration of the broadcast for "Content 1" is 1 hour, field 427 indicates the channel on which the content is presented is "ABC" and field 428 provides the title and/or other description of the presented content, e.g., 14th Episode of the 6th Season of the TV Show "Lost." In one embodiment, only the channel and the time is used to identify the content. As an alternate example, if the channel is a particular advertised "video on demand" program related content, the content is transmitted to a display component when a viewer demands the content. Accordingly, the content may not have a particular associated broadcast time applicable to the plurality of display components. In such an embodiment, the content channel may alone indicate the content (i.e., no start time may be stored in field 424). The resulting content data set is stored by the system in the content data storage area 236. Although only a single piece of content is illustrated in FIG. 4B, it will be appreciated that the table 420 includes entries for multiple pieces of content, and may contain additional information about the content beyond what is depicted in FIG. 4B.

In some embodiments, some or all of the content data may be provided by an external information source (for example, information from an external database or information provider such as FYI Television Inc. of Grand Prairie, Tex.; ROVI Corporation of Santa Clara, Calif.; or Tribune Media Services of Chicago, Ill.), by data entered by a system user, by reliance on predetermined information, or any combination of the aforementioned information sources. In some embodiments, the system may automatically derive some content data based on, for example, "brand" data associated with the utilized advertisement (e.g., "CBS-Good Wife") from which the channel ("CBS") and the name of the content ("Good Wife") may both be determined. The system may then consult a television program listing database to determine, for the advertised content program name, other information associated with the content (e.g., broadcast channel (s), broadcast dates and times, durations, etc.).

Some advertisements for televised content may refer to a single program or episode, while others may refer to multiple broadcast programs or episodes. For example, an advertisement may be for a specific episode of a specific season of ABC's "Lost" series, e.g., "Lost Season 10, Episode 6"; or the advertisement may refer to a plurality of programs with multiple and discontinuous broadcast times, for example all episodes of "ABC Lost, Season 10." To support advertisements for content with multiple discontinuous broadcast times or channels, there may be multiple content identifier entries associated with that advertisement in advertisement data storage area 234. That is, the system may populate advertised content identifier field 422 with multiple identifiers of content associated with a single advertisement. Alternately, the system may generate a content identifier for content identifier field 422 that links the multiple pieces of related content that are broadcast at different times or on different channels.

In some embodiments, one or more third parties provides at least a portion of the advertisement data or the content data to the system 102. These third parties can include, but are not limited to, a media measurement company, an advertising data provider, an agency, a television content provider, or a television service provider. For example, a media measurement company may provide advertisement data in the form of a database of national advertisement insertions. In another example, a television content provider or television service provider, such as a network or a broadcast facility, provides a portion of the advertisement data in the form of "as-run logs." Accordingly, when received by the data collection module 210, additional cleaning and processing is performed in order to extrapolate data utilized by the system for determining the effectiveness of content advertisement. In some embodiments, a user of the system 102 provides all or a portion of the advertisement data or the content data, such as by uploading information into a software user interface.

Both the advertisement data and the content data can be stored in respective storage areas 234, 236, in the clean and processed format as shown in the example data sets of FIGS. 4A-4B. In some embodiments, the raw data, such as the advertisement data and the content data originally received by the data collection module 210, can additionally be stored in the storage database 230 in respective storage areas 234, 236 for the advertisement data and the content data.

Figure 5:
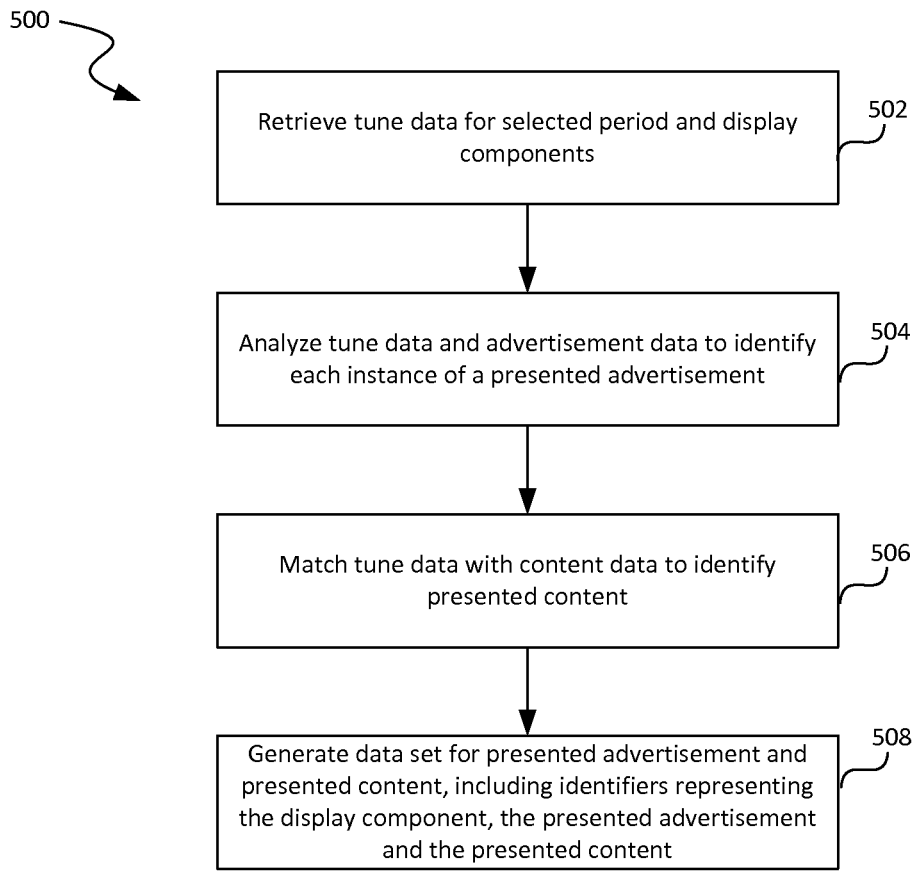
FIG. 5 is a flow diagram of a process performed by the system to determine the advertisements and content that were presented on a display component being analyzed.

Referring to FIG. 2, the operation of the advertisement exposure determination module 240 is now described with reference to FIG. 5 and FIGS. 6A-6B. At block 502, the system retrieves the stored tune data 232 for comparison to the advertisement data and the content data. The system selects tune data for analysis based on a time period being analyzed and a set of desired display components to be analyzed. For example, the system may analyze all data associated with a particular cable operator for the month of February to analyze advertisement effectiveness for the sweep month of February.

At a block 504, the advertisement exposure determination module 240 analyzes the retrieved tune data and the advertisement data to determine which advertisements were presented on display components to viewers. The analysis estimates exposures to viewers, since the presence of viewers is indirectly determined by use of the tune data.

As shown in the example data set provide in FIG. 6A, the system populates a table 600 with advertising presentation data. The advertising presentation data shows a correlation between an identifier associated with the advertisement ("Ad 1"), content represented by the advertisement ("Content 1"), and the display components (if any) on which the advertisement was presented ("DC1," "DC2"). The correlation between the content advertisement ("Content 1") and the advertisement ("Ad 1") is derived from the advertisement data. The correlation indicating the advertisement was presented on a display component represented by each display identifier is determined by comparing the start time, duration, and channel of each advertisement with tune data for the display components to produce a list of those display components that were tuned to the appropriate channel at the appropriate time for a viewer to see the advertisement being processed. The matching is performed on each advertisement being processed, e.g., provided in the advertisement data set in the table 410 of FIG. 4A, and on tune data associated with an identifier for each display component, The advertisement exposure determination module 240 stores the presented (e.g., matched) advertisements as advertisement presentation data 235 in the storage database 230 of the system 102.

The system may utilize various matching heuristics to determine a positive correlation between the tune data for a particular display component and the advertisement data set. For example, one heuristic matches a display component with an advertisement if the display component presented any portion of the advertisement, e.g., if there is any overlap in the interval determined by the start time and the end time of the advertisement and the indication that a display component is tuned to the advertisement. As another example, another heuristic includes matching a display component with an advertisement only if the display component presented the entire duration of the advertisement. As yet another example, a heuristic includes matching a display component only if the display component presented at least a predetermined portion of the advertisement, such as a threshold amount. The threshold amount can include the exact middle of the advertisement, the middle 50% of the duration of the advertisement, or an accumulation of 15 seconds of any portions of a 30-second advertisement, etc.

At block 506, an content presentation determination module 250 utilizes the tune data 232 in order to determine the display components on which content has been presented. The system determines which display components that content has been presented on by matching the display component's associated tune data with the start time, duration, and channel of the content to produce a list of display components associated with the content being processed. The content presentation determination module 250 matches tune data for each content identifier being processed and for each display component having a display identifier associated with stored tune data.

At block 508, a data set is generated by the system which identifies the display components on which content has been presented. FIG. 6B shows an example of a resulting data set reflecting presented content as determined by the content presentation determination module 250. The presented content is identified by a content identifier 650, "Content 1," and the display components on which that content was presented are identified by display identifiers 660, "DC1, DC 3, . . . ," The presented content is stored as content presentation data in the storage area 237. Various matching heuristics, similar to the matching heuristics described above for matching advertisements with tune data associated with particular display components, may also be used to match content with tune data associated with particular display components. For example, a display component may be associated with a particular piece of content if the display component is tuned to the channel presenting that content for at least 50% of the length of the presented content.

Content and content advertisements may be correlated in a one-to-one or one-to-many fashion. The advertisement data set 410 may, for any content entry, contain a single or multiple associated content advertisements. For example, the advertisement identifiers "Ad 1", "Ad 2", . . . "Ad 6" in column 412 of FIG. 4A reflect six advertisements for a particular Episode of "Lost" ("Content 1"). In other examples, an advertisement may be for a season of "Lost" comprising multiple episodes. The advertisement may therefore be mapped to multiple pieces of content. Multiple content advertisements associated with particular content may be broadcast at various times and/or on various channels.

Figure 7:
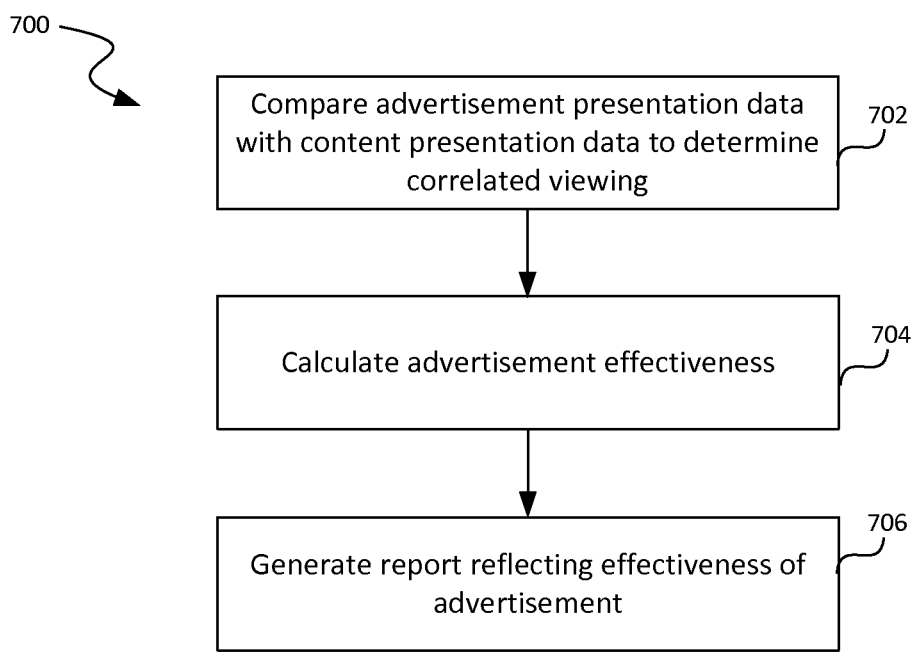
FIG. 7 is flow diagram of a process performed by the system to determine the effectiveness of content advertisements.

Referring again to FIG. 2, the operation of the advertisement effectiveness analysis module 260 is described with reference to a process 700 shown in FIG. 7. At block 702, the advertisement effectiveness analysis module 260 processes at least the advertisement presentation data 235 and the content presentation data 237 to correlate viewing of the presented advertisement with the presented content. That is, the system determines when viewers of a particular display component were exposed to an advertisement for content and then subsequently viewed the advertised content. The correlation is utilized by the system to generate advertising effectiveness data 239.

Figure 8:
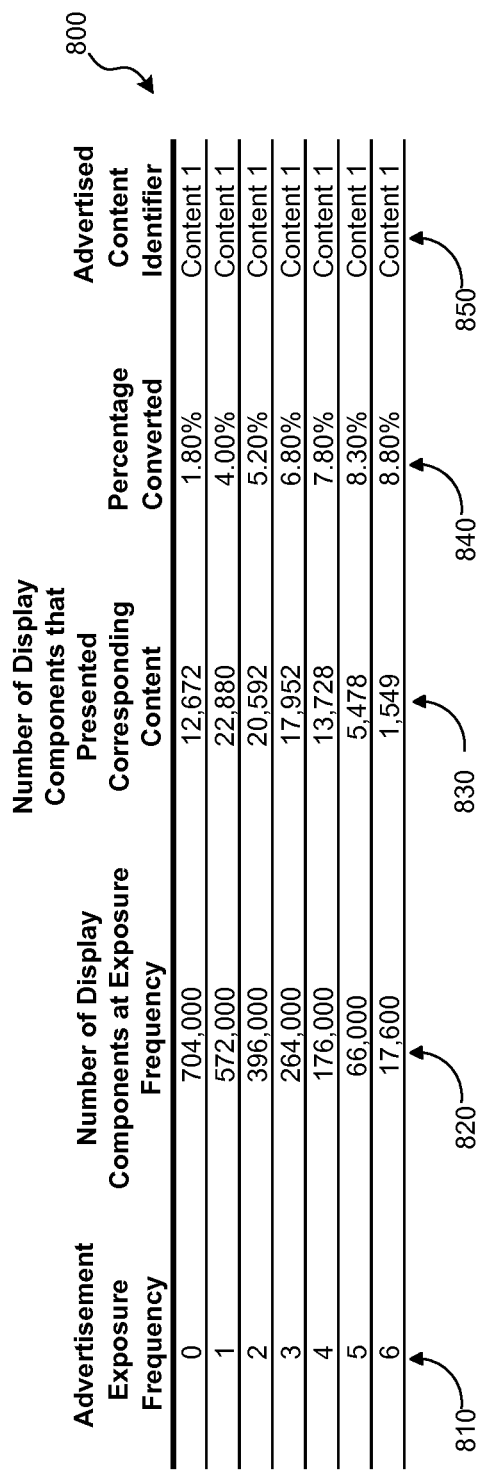
FIG. 8 depicts a representative data set providing content advertisement effectiveness statistics as calculated by the advertisement effectiveness analysis system.

For example, as shown in FIG. 8, the system may process the advertisement presentation data 235 for particular content (e.g., "Content 1") to generate data sets including a number of display components 820 that were accessing particular channels during a particular time interval such that viewers of those channels were exposed to various frequencies 810 of advertisements for that particular content. The advertisement exposure frequency 810 can include multiple viewing of the same or different advertisements pertaining to the analyzed content (e.g., "Content 1"). For example, the system may determine the number of viewers of content on display components that were exposed to zero (0) advertisements for "Content 1" (e.g., 704,000), one (1) advertisement for "Content 1" (e.g., 572,000), two advertisements for "Content 1" (e.g., 396,000), etc. Some practitioners of the art may refer to the count of advertisements viewed by a viewer as the "frequency of exposure," and the total number of such viewers as the "reach" of the advertisement.

At block 704, the advertisement effectiveness analysis module 260 can further process each of the list of display components that present a particular number of advertisements to determine how many of those display components also presented the corresponding advertised content. The display components having correlated presented advertisements and presented content can be identified by matching component identifiers in the content presentation data 237, as previously described. The determined number of display components that presented corresponding content, provided in column 830, may then be utilized by the advertisement effectiveness analysis module 260 to perform various calculations on the effectiveness of advertisement(s) for a particular piece or pieces of content. As shown in FIG. 8, the analysis performed by the system may involve manipulation of portions of the advertising effectiveness data 239 to produce new advertising effectiveness data. The percentage converted 840 is calculated by the system based on the exposure frequency associated with a particular display component. The percentage converted 840 may be calculated by taking the number of display components that presented content divided by the total number of display components exposed to the presented advertisement at each level of advertisement exposure frequency.

In some embodiments, the content advertising effectiveness analysis component 260 may analyze only certain numbers of advertisement exposures 810, or only certain advertisements (e.g., "Ad 1"), or only certain groups of display components. For example, the system 102 may exclude display components not matching desired demographics (e.g., not in a household of a particular geographic region), display components not matching desired viewing behavior (e.g., not associated with a heavy, medium, or light viewer), etc.

It will be appreciated that the number of display components on which an advertisement and content are presented may be converted to an estimate of the number of viewers (i.e., individuals) who viewed the content. The number of viewers of each display component may be estimated using a variety of methods. For example, a national or regional average number of viewers associated with each display component during certain hours (e.g., 1.6 viewers during prime time per television) may be used to estimate the number of potential viewers of content or content advertisements. As another example, addresses associated with particular display components may be correlated with census data to estimate a number of likely viewers within a particular household that are exposed to content or content advertisement.

Figure 9:
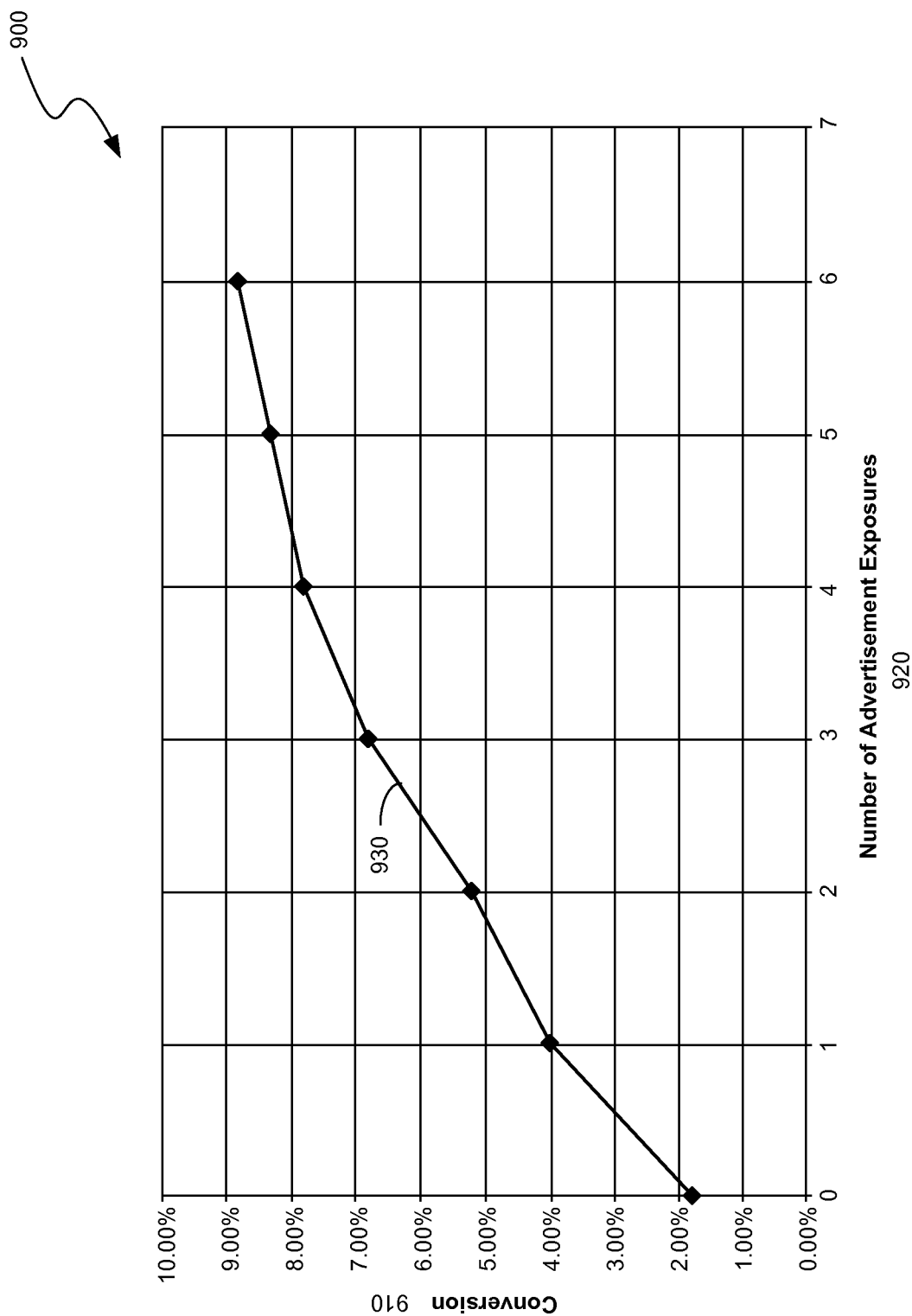
FIG. 9 is a representative graph of advertisement effectiveness generated by the system for the analysis of content advertising effectiveness.

At block 706, the advertising effectiveness analysis module can further process the calculated various data sets described above to generate reports reflecting the effectiveness of particular advertisements for corresponding content. The report can include statistical charts, such as the data set provided in FIG. 8, and additional visual metrics reflecting the effectiveness of a particular advertisement. For example, as shown in FIG. 9, a graphical representation based on the advertising effectiveness data provided in FIG. 8 is illustrated. The system may create additional representations of the various calculated, used, and/or stored data for reporting content advertisement effectiveness. Various techniques may be employed to generate and deliver reports, as described further in U.S. patent application Ser. No. 13/096,964, filed Apr. 28, 2011 entitled "METHOD AND SYSTEM FOR PROGRAM PRESENTATION ANALYSIS", the content of which is hereby incorporated by reference in its entirety.

The graph 900 provided in FIG. 9 illustrates the correlation 930 between the number of times that a viewer is exposed to an advertisement and the subsequent viewing of the advertised content. The x axis represents the number of advertisement exposures provided in column 810. The y axis represents the percentage of converted presentation provided in column 840. As shown in the visual representation, the effectiveness of the advertisements for "Content 1" increases with the number of advertisement exposures. The slope of the graph reflects a return on investment for each additional ad exposure. Initial ad exposures are very effective, as the conversion rate climbs fairly quickly. After four exposures, however, the conversion rate slows and the value for each additional advertisement exposure diminishes. Content advertisers can use the graph 900 to quickly assess the effectiveness of advertising for a particular piece of programmed content. The system may construct the graph 900 for different channels, time periods, demographics, etc. to allow advertisers to more accurately calibrate the advertising spend for particular content.

In some embodiments, charts or reports may present advertising effectiveness comparisons that may be useful for the system user to better understand the effectiveness of various advertisements. For example, the chart or report may present more than one chart allowing the multiple charts to be compared, or multiple data series plotted in a single chart. One such data series that may be compared is the average effectiveness for all content advertisements. Alternately or additionally, the system may filter the advertisements according to the advertisement data 410 provided in FIG. 4A, such as by filtering the data to a particular range of values for advertisement duration, advertisement times (e.g., by daypart), advertisement channels (e.g., by broadcast network), or a particular advertisement ("Ad 1"), etc. Alternately or additionally, the system may filter the display components (e.g., 120(a), 120(b), 120(c) in FIG. 1) from which the tune data is collected according to certain demographics or viewing behavior patterns for which the system may be able to determine for those display components. Such filtering can be performed on the tune data received initially from the content providers or, alternatively, by filtering the components within the data sets provided in FIG. 5A-5B prior to performing further analysis.

In additional embodiments, the system 102 may enable a system user to determine whether two 30 second duration commercials are more effective than one 60 second duration commercial, whether an advertisement on one channel is more effective than an advertisement on another channel, whether an advertising campaign or particular advertisement is more effective among viewers who are "heavy" viewers than those who are "light" viewers, or whether particular advertisements among viewers who match a particular viewer demographic are more effective, etc. Other system modules beside the advertisement effectiveness analysis module 260 may employ filtering. For example, the data collection module 210 may filter the tune data by viewer demographics. Filtering may reduce the amount of tune data, advertisement data and content data which needs to be processed by the system 200.

In additional embodiments, the system user may be a member of the advertising industry, such as an advertiser who is interested to learn how effective their advertisements were in driving viewers to see advertised content. The system user may provide input to the system to indicate which advertisements, type of viewer associated with a display component, type of display component, or advertised content the system user is interested in analyzing. The system user may provide input to the system to indicate otherwise how the system user desires the system to perform the analysis. For example, the system user may specify that the user wishes for DVR device tune data to be used for a specific duration of time since that tune data was broadcast (e.g., 3 days). As another example, the system user may specify that the user wishes to analyze information for which a minimum statistical significance is available. For example, the system user may specify that the user wishes for a certain degree of statistical validity to be required by the analysis. For example, the 8.80% conversion reflected in chart 900 for 6 exposures may not have adequate statistical validity for it to be inserted into the chart 900 based on only 17,600 viewers at that exposure level.

While FIGS. 4, 6, and 8 depict tables whose contents and organization are designed to make them more comprehensible by a human reader, those skilled in the art will appreciate that the actual data structure(s) used by the facility to store this information may differ from the tables shown, in that they, for example, may be organized in a different manner, may contain more or less information than shown, may be compressed and/or encrypted, and may be optimized in a variety of ways.

Aspects of the system may be implemented on one or more computing devices, such as server computers, personal computers, etc. Computer readable instructions may implement all or portions of the system, and may be stored on a computer readable medium such as storage area 230. The computer readable instructions may be executed by one or more processors.

One skilled in the art will understand that aspects and implementations of the system have been described in the general context of computer-executable instructions that are executed on a server computer. It will be appreciated that the disclosed technology can be practiced with other computer system configurations, including desktops, laptops, multi-processor systems, microprocessor-based systems, mini-computers, mainframe computers, or the like. The disclosed technology can be embodied in a special purpose computer or data processor that is specifically programmed, configured, or constructed to perform one or more of the computer-executable instructions explained in detail below.

The disclosed technology can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Aspects of the technology described herein may be stored or distributed on tangible, non-transitory computer-readable media, including magnetic and optically readable and removable computer discs, stored in firmware in chips (e.g., EEPROM chips). Alternatively, aspects of the invention may be distributed electronically over the Internet or over other networks (including wireless networks). Those skilled in the relevant art will recognize that portions of the system may reside on a server computer, while corresponding portions reside on a client computer in communication with the server computer.

A computing system within which the invention may be implemented in one or more CPUs configurable to access one or more memories or storage devices, which may contain components, such as software, firmware, or hardware components, that implement all or portions of the invention and which may be interconnected by networks, such as the Internet, a private network, a wired network, or a wireless network. Aspects of the system may be implemented by computer readable instructions, which may reside in computer readable storage devices or media such as CDs, DVDs, hard disks, ROM, RAM, other memories, and so on. In some embodiments, portions of the system may reside on customer premises equipment, such as STBs, DVRs, personal computers, and so on. In some embodiments, portions of the system may reside on one or more computer servers (physical or virtual.) In some embodiments, curves may be utilized which represent discrete values rather than continuously changing values, and vice versa.

The terms "computer" and "computing device," as used generally herein, refer to devices that have any data processor and non-transitory memory containing instructions that are executed by the processor. Data processors include programmable general-purpose or special-purpose microprocessors, programmable controllers, application-specific integrated circuits (ASICs), programmable logic devices (PLDs), or the like, or a combination of such devices. Software may be stored in memory, such as random access memory (RAM), read-only memory (ROM), flash memory, or the like, or a combination of such components. Software may also be stored in one or more storage devices, such as magnetic or optical-based disks, flash memory devices, or any other type of non-volatile storage medium or non-transitory medium for data. Software may include one or more program modules, which include routines, programs, objects, components, data structures, and so on that perform particular tasks or implement particular abstract data types.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A computer implemented method for analyzing content advertisement effectiveness for advertised video content, the method comprising:

receiving, on a computer system, first tune data from software installed on a plurality of set top boxes, each associated with a first display component, the first tune data including at least a channel and an associated channel access time interval presented on each of the first display components, wherein each first display component is represented by a first display identifier, and wherein the first display identifier is associated with a selection of the first tune data corresponding to the first display component represented by the first display identifier;

receiving, on the computer system, second tune data from software installed on a plurality of network gateways, each associated with a second display component, the second tune data including at least a channel and an associated channel access time interval presented on each of the second display components, wherein the second display component is represented by a second display identifier, and wherein the second display identifier is associated with a selection of the second tune data corresponding to the second display component represented by the second display identifier;

comparing, on the computer system, the tune data associated with each display identifier to content schedule data, the content schedule data including a channel, an associated presentation time interval, and a content identifier for each piece of video content;

identifying, on the computer system, one or more pieces of video content presented on each display component based on comparing the tune data associated with each display identifier to the content schedule data;

comparing, on the computer system, the tune data associated with each display identifier to advertisement schedule data, the advertisement schedule data including a channel, an associated presentation time interval, and an advertised content identifier for each advertisement;

identifying, on the computer system, one or more advertisements advertising pieces of video content presented on each display component based on comparing the tune data associated with each display identifier to the advertisement schedule data, and populating an advertisement table with the identified advertisements advertising pieces of video content;

comparing, on the computer system, a time interval that the display component is presenting the identified pieces of video content to a predetermined time interval to determine that the display component is presenting the predetermined time interval of the identified pieces of video content, wherein the predetermined time interval is a middle 50% of the identified pieces of video content;

correlating, on the computer system, for each display component, the identified pieces of video content presented on the display component with the identified advertisements presented on the display component the correlation comprising matching the content identifiers corresponding to the identified pieces of video content with the advertised content identifiers corresponding to the identified advertisements, wherein the correlation is based on the display component presenting the predetermined time interval of the identified pieces of video content;

populating a correlated table with the correlated piece of video content;

determining, on the computer system, a number of display components presenting the correlated piece of video content based on the correlated table and a number of display components presenting the identified advertisements advertising the piece of video content based on the advertisement table;

determining, on the computer system, an effectiveness of advertisements advertising a piece of video content based on the determined number of display components presenting the correlated pieces of video content and the determined number of display components presenting the identified advertisements advertising the piece of video content; and generating, on the computer system, a report including visual metrics reflecting the effectiveness of the advertisements advertising the piece of video content and including at least the identified advertisements advertising pieces of video content, the identified pieces of video content, and the correlated pieces of video content and advertisements.

2. The method of claim 1, wherein two or more advertisements are identified in the tune data associated with one display identifier.

3. The method of claim 2, wherein the two or more advertisements correspond to the piece of video content.

4. The method of claim 1, wherein one advertisement is associated with video content presented at two or more differing presentation time intervals.

5. The method of claim 1, further comprising assigning an advertisement identifier to each advertisement identified in the advertisement schedule data.

6. The method of claim 1, further comprising generating one or more data sets defining the advertisement schedule data for each identified advertisement and defining the content schedule data for each identified piece of content.

7. The method of claim 1, further comprising determining an exposure frequency of the identified advertisements correlated to the identified pieces of video content for each display component, wherein the exposure frequency is calculated by a sum of advertisements presented on a display component for a singular piece of video content.

8. The method of claim 1, further comprising filtering any one or more of the tune data, the advertisement schedule data, and the content schedule data based on advertisement attributes, wherein the advertisement attributes include any one or more of advertisement presentation time, advertisement duration, advertisement channel, and advertisement demographic.

9. The method of claim 1, further comprising cleaning the advertisement schedule data and the content schedule data prior to identifying presented content and presented advertisements.

10. The method of claim 1, further comprising:
generating a graph of the effectiveness of advertisements advertising the piece of video content; and
transmitting the graph of the effectiveness of advertisements advertising the piece of video content to a remote device for visual representation on a display.

11. The method of claim 1, further comprising:
receiving an user input comprising one or more desired advertisement attributes;
filtering any one or more of the tune data, the advertisement schedule data, and the content schedule data based on the user input; and
determining an adjusted effectiveness of advertisements advertising the piece of video content based on the filtered data.

12. A system for analyzing content advertisement effectiveness for advertised video content, the system comprising:
at least one processor;
at least one memory comprising instructions configured to be executed by the at least one processor to perform a method comprising:
receiving, on a computer system, first tune data from software installed on a plurality of set top boxes, each associated with a first display component, the first tune data including at least a channel and an associated channel access time interval presented on each of the first display components, wherein each first display component is represented by a first display identifier, and wherein the first display identifier is associated with a selection of the first tune data corresponding to the first display component represented by the first display identifier;
receiving, on the computer system, second tune data from software installed on a plurality of network gateways, each associated with a second display component, the second tune data including at least a channel and an associated channel access time interval presented on each of the second display components, wherein the second display component is represented by a second display identifier, and wherein the second display identifier is associated with a selection of the second tune data corresponding to the second display component represented by the second display identifier;
comparing the tune data associated with each display identifier to content schedule data, the content schedule data including a channel, an associated presentation time interval, and a content identifier for each piece of video content;
identifying one or more pieces of video content presented on each display component based on comparing the tune data associated with each display identifier to the content schedule data;
comparing the tune data associated with each display identifier to advertisement schedule data, the advertisement schedule data including a channel, an associated presentation time interval, and an advertised content identifier for each advertisement;

identifying one or more advertisements advertising pieces of video content presented on each display component based on comparing the tune data associated with each display identifier to the advertisement schedule data, and populating an advertisement table with the identified advertisements advertising pieces of video content;

comparing a time interval that the display component is presenting the identified pieces of video content to a predetermined time interval to determine that the display component is presenting the predetermined time interval of the identified pieces of video content, wherein the predetermined time interval is a middle 50% of the identified pieces of video content;

correlating, for each display component, the identified pieces of video content presented on the display component with the identified advertisements presented on the display component, the correlation comprising matching the content identifiers corresponding to the identified pieces of video content with the advertised content identifiers corresponding to the identified advertisements, wherein the correlation is based on the display component presenting the predetermined time interval of the identified pieces of video content;

populating a correlated table with the correlated piece of video content;

determining a number of display components presenting the correlated piece of video content based on the correlated table and a number of display components presenting the identified advertisements advertising the piece of video content based on the advertisement table;

determining an effectiveness of advertisements advertising a piece of video content based on the determined number of display components presenting the correlated piece of video content and the determined number of display components presenting the identified advertisements advertising the piece of video content; and generating a report including visual metrics reflecting the effectiveness of the advertisements advertising the piece of video content and including at least the identified advertisements advertising pieces of video content, the identified pieces of video content, and the correlated pieces of video content and advertisements.

13. The system of claim 12, wherein two or more advertisements are identified in the tune data associated with one display identifier.

14. The system of claim 12, wherein one advertisement is associated with video content presented at two or more differing presentation time intervals.

15. The system of claim 12, wherein the method to be executed by the at least one processor further comprises assigning an advertisement identifier to each advertisement identified in the advertisement schedule data.

16. The system of claim 12, wherein the method to be executed by the at least one processor further comprises generating one or more data sets defining the advertisement schedule data for each identified advertisement and defining the content schedule data for each identified piece of content.

17. The system of claim 12, wherein the method to be executed by the at least one processor further comprises determining an exposure frequency of the identified advertisements correlated to the identified pieces of video content for each display component, wherein the exposure frequency is calculated by a sum of advertisements presented on a display component for a singular piece of video content.

18. The system of claim 12, wherein the method to be executed by the at least one processor further comprises filtering any one or more of the tune data, the advertisement schedule data, and the content schedule data based on advertisement attributes, wherein the advertisement attributes include any one or more of advertisement presentation time, advertisement duration, advertisement channel, and advertisement demographic.

* * * * *